Figure 1:
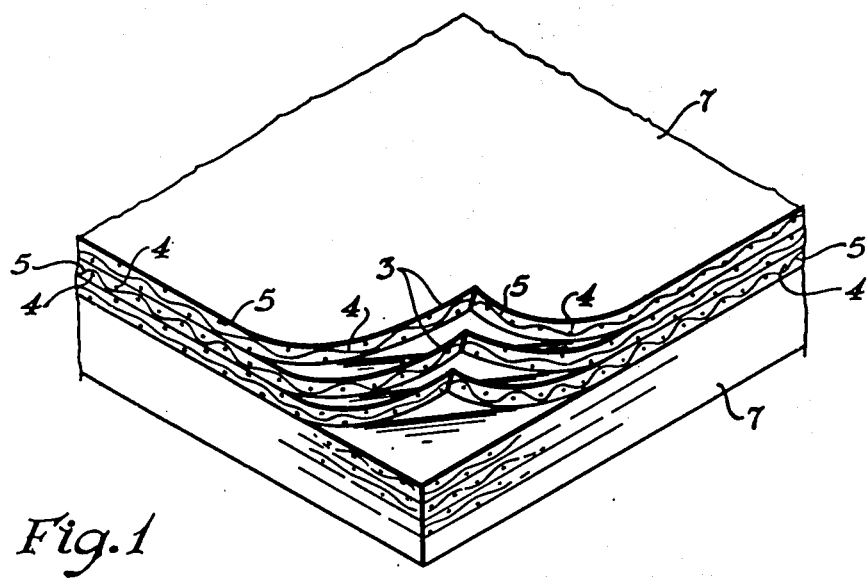

April 5, 1949.　　　E. L. KROPSCOTT ET AL　　　2,466,597

NONMETALLIC ARMOR

Filed Nov. 27, 1944

INVENTORS
Arnold R. Gobel
BY Earle L. Kropscott

Griswold & Burdick
ATTORNEYS

Patented Apr. 5, 1949

2,466,597

UNITED STATES PATENT OFFICE 2,466,597

NONMETALLIC ARMOR

Earle L. Kropscott and Arnold R. Gabel, Midland, Mich., assignors to The Dow Chemical Company, Midland, Mich., a corporation of Delaware Application November 27, 1944, Serial No. 565,428

5 Claims. (Cl. 154—52.5)

This invention relates to a composite article of high impact strength, and more particularly to a non-metallic structure suitable for use as a lightweight armor for protection against low velocity projectiles.

Because of the high density of metal armor plate, the effective protection afforded by a unit weight is very low. A large effective area of protection per unit weight of armor is important especially in personal or body armor and in armor for aircraft. Personal armor must be light, to be carried easily, and in military uses it must not interfere with a soldier's ability to carry his normal accoutrements. Aircraft armor must afford protection with a minimum resultant decrease in effective speed, range, or carrying capacity.

The major purpose of both personal armor and aircraft armor is to deflect or stop such low velocity projectiles as spent bullets, shrapnel, including the type known as "flak," and bomb splinters, all of which account for a greater proportion of the injuries to combat personnel than do direct hits by aimed projectiles. The velocities of such low velocity projectiles are usually less than 1200 feet per second.

It is accordingly among the objects of the present invention to provide a relatively lightweight and nonmetallic armor suitable for protection against low velocity projectiles. The provision of suitable compositions of matter and of a method of producing the desired articles is considered to be a related object. Other objects may become apparent from the following description and the apended claims.

It has now been found, in accordance with the present invention, that a suitable lightweight and nonmetallic armor may be made, which gives effective protection against low velocity projectiles, and which may be formed to any desired shape and size by simple compression molding operations. The armor of the present invention comprises a composite multi-layer structure of a certain type of fibrous glass textile and a particular class of ethyl cellulose composition, to be described more fully hereinafter. It may be provided in thicknesses adequate to stop many so-called high velocity projectiles.

The composite, multi-layer structure may, for convenience, be described as a laminated product, but it should be made clear that, as compared with most laminates common in the art, this product would not be considered representative of a very high quality of lamination. This is true because, for most purposes a laminated article should have continuous adherence between the successive laminae, whereas, for the purpose of the present invention it is desirable that the adherence should be to a certain extent discontinuous so as to yield progressively from layer to layer until the force of the impact is absorbed, and fracture of the structure on impact of the projectile must be avoided. Laminates having continuous adherence between the layers are more easily penetrated by bullets than those of the present invention, which are less rigidly bonded. The quality of discontinuous lamination possessed by the articles of the present invention produces an internally yieldable structure which is herein defined as an internally yieldable lamination.

The fibrous glass textile for use in the invention, it has been found, must be of the continuous filament type, since textiles made from staple glass fiber, chopped fiber, or staple scrap do not afford adequate protection when incorporated in laminated structures of the type here concerned. It has been found, as well, that the degree of protection, in otherwise equivalent structures, increases as the diameter of the continuous glass filaments decreases. Thus, using one commercial designation, a "450 yarn" is superior to a "250 yarn" in woven glass textiles for the present purpose, the former being made of filaments roughly half the diameter of those in the latter yarn. It has also been found that, while good results can be and are obtained when using textiles in which both the warp and the weft are of glass fiber, improved results are obtained when using textiles having a warp of continuous glass filaments twisted into multi-filament yarns and a weft or filling of cotton. Satisfactory types of glass textiles are those which are known commercially at "OC" and "ECC" types, particularly "OC-64," "OC-111," and "ECC-11-127," as made and sold by the Owens-Corning Fiberglas Company.

The ethyl cellulose composition used in binding together a number of sheets of the preferred glass textile should be one which is adapted for compression molding operations, and should contain agents capable of preventing the hot material from sticking to the mold, in quantities sufficient to prevent perfect or continuous lamination, for the reasons previously mentioned. More specifically, it has been found that the composition should contain from 80 to 90 percent of an ethyl cellulose having an ethoxy value of from 47 to 49 per cent, and should be of a type whose 5 per cent solution, by weight, in a mixture of 80 parts of toluene and 20 parts of ethanol, by volume, has a viscosity between 50 and 150 centipoises, and more advantageously between 80 and 120 centipoises. Ethyl cellulose in the latter viscosity range will be referred to herein as "100 centipoise type." The composition should contain from 1 to 6 per cent of a mold release agent, and, when applied as a lacquer to the glass textile, the dope should contain, on the solids basis, from 4 to 6 per cent of such agent. The mold release agent may be stearic acid alone, when amounts of about 1 per cent are used, but is more advantageously a mixture of equal parts of stearic acid, magnesium stearate, and the methyl ester of 12-hydroxy stearic acid. The total of ethyl cellulose and mold release agent should be at least 85 per cent. The balance of the solids in the composition, which may vary from 4 to 15 per cent, is a solvent type of plasticizer for the ethyl cellulose, which may, but need not, be a phthalate or a phosphate plasticizer, and which, in the most effective compositions yet found for the purpose, is mono-phenyl di-orthoxenyl phosphate. In addition to the above requirements as to composition, a physical requirement is that the composition, when subjected to 1500 pounds pressure per square inch, at a temperature of 110° C., must flow 1.5 inches in from 70 to 160 seconds, as measured in ASTM D–569–43.

The laminated structure may be prepared by a molding operation. If desired, alternate layers of a previously prepared film of an ethyl cellulose composition and of the fibrous glass textile may be placed in a suitable mold and compressed under the conditions of temperature and pressure which will be described later. Generally speaking, however, it is more advantageous to dissolve the ethyl cellulose composition in a suitable lacquer solvent to prepare a coating dope and to apply a thin coating of the composition to the glass textile. This may be done by spraying, brushing, or any of the standard machine coating operations and, for the particular method employed, the composition will be dissolved to form the most appropriate viscosity solution. In coating the glass textile, it has been found that the ratio of coating composition to glass should be so chosen as to provide a dried article wherein from 70 to 80 per cent of the weight is the glass textile and correspondingly from 30 to 20 per cent is the ethyl cellulose composition. Lesser amounts of the ethyl cellulose composition apparently do not provide adequate adhesion between the layers of glass textile in the finished product, while greater quantities effect too great a cementing action on the successive layers of fibrous glass and prevent the necessary yielding of the composite article when struck by a projectile. The most satisfactory articles which have been prepared from the standpoint of their use as armor have been found on analysis to consist of from 65 to 80 per cent of material which is neither decomposed nor volatilized when heated in a furnace at 1000° F.

In commercial operation, the fibrous glass textile is coated either in the form of individual sheets or as a continuous roll with the ethyl cellulose composition and dried at a moderate temperature to remove the volatile solvents. The sheets are then cut to the desired shape and size and are superimposed one on another until enough material is so stacked to provide the required final thickness after molding. It is preferable, in this operation, to align successive layers of the coated glass textile at right angles to the adjacent layers. Articles of equivalent strength but of higher density may be made by plying two sheets in one direction and then two at right angles to the first pair. The assembly is placed in the cavity of a compression mold and preheated in the closed mold without application of any appreciable pressure until the temperature of the entire assembly has been brought to at least 360° F. This may require a period of from 3 to 12 minutes or longer, depending upon the thickness of the article. When the final molding is to be 1/8 of an inch thick, a preheating period of from 8 to 10 minutes is usually satisfactory. After preheating, as above described, pressure is applied to compress the sheets and to cause cohesion therebetween. Satisfactory pressures are in the range from 500 to 2000 pounds per square inch and the most consistent results are obtained with pressures from 1500 to 2000 pounds. No appreciable advantage is obtained through the use of higher pressures and a distinct disadvantage results from the application of more than a few hundred pounds pressure during the preheating operation. It is only necessary to maintain the molding temperature of from 350 to 380° F., and preferably from 360 to 370° F., for from 1 to 3 minutes after the high pressure is applied. That pressure is then maintained while the molded article is cooled at least to a temperature below the distortion point of the plastic composition. The so-prepared article may then be ejected from the mold and is ready for use, possibly after further fabrication operations, as an armor for protection against low velocity projectiles. Large sheets of the material so molded may be used as floor plate in aircraft while smaller sizes cut to suitable shapes, may be used to surround the pilot's compartment in aircraft or may be employed with suitable padding as personal armor, in vests, helmets or like articles.

Figure 2:
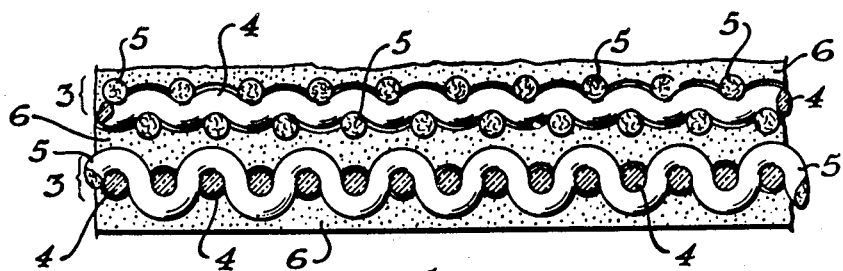

One preferred embodiment of the invention is illustrated in the annexed drawing, wherein Fig. 1 is an isometric view in exaggerated scale of the new laminated article, with three layers peeled back to illustrate the structure; and Fig. 2 is a greatly exaggerated section through two layers of the new article.

In the said drawing, a glass fabric 3, having continuous multi-filament glass warp 4 and cotton filler 5, is coated with the herein described ethyl cellulose composition 6, and bonded to a similarly coated fabric turned so that the warps 4 in successive layers are at right angles to one another. The composite article 7 may be used as lightweight nonmetallic armor. The quality of discontinuity in the laminate is illustrated in Fig. 2 of the drawing by the double line about the continuous glass warps 4, representing imperfect lamination due to the amount of mold release agent originally in the composition 6.

Numerous tests have been made to determine the protective power of the laminated structures of the present invention. While these laminated structures have been made in thicknesses ranging from about 1/16 of an inch up to 1¼ inches, preliminary tests for purposes of comparison with other armoring material such as aluminum or steel have been made on small samples approximately 6 inches square by 0.1 or 0.2 inch thick. It has been found that, when a laminated article 0.1 inch thick has been made in accordance with the present invention, it will stop a .45 caliber revolver bullet fired at pointblank range of 10 feet. With the powder load used in the standard tests, this was indicative of an ability to stop projectiles having a velocity of from 850 to 1000 feet per second. A sample which would pass this test was considered satisfactory for further testing at velocities exceeding those normally encountered with random projectiles.

The following examples illustrate the manner in which the articles of the present invention may be made and describe some of the tests to which such articles have been subjected.

*Example 1.*—A continuous sheet of a fibrous glass textile 36 inches wide having a continuous filament warp and a cotton filler (Owens-Corning Fiberglas Company OC-64) was coated to provide a finished sheet of which 80 per cent by weight was the glass textile and 20 per cent was an ethyl cellulose composition containing the following parts by weight: ethyl cellulose (48.3 per cent ethoxy, 100 centipoises) 82 per cent, plasticizer (mono-phenyl di-orthoxenyl phosphate) 12 per cent, stearic acid 2 per cent, magnesium stearate 2 per cent, methyl 12-hydroxy stearate 2 per cent. The coating was deposited from a solution in a solvent consisting of 80 parts of toluene and 20 parts of ethanol by volume. The sheet was cut into thirty six-inch squares when dry. Twenty-one such squares were stacked with the glass warp in each layer at 90° to that in adjacent layers. The assembly was preheated to 360° F. for ten minutes and then placed between polished plates at 1500 pounds per square inch for two minutes while maintaining the temperature at 360° F. after which the press was cooled under pressure until the temperature of the laminate was below 120° F. when it was finally removed from the mold. This nonmetallic armor had a thickness of 0.188 inch and a density of 1.80. Samples cut from the sheet were hung in a ballistic pendulum to measure the velocity of the projectile at impact and were fired upon using a non-deformable chilled steel ball 0.219 inch in diameter fired from a ".22 Hornet" rifle using a hand-loaded powder charge. The test method was based on that described by C. Panseri, in "Light Metals" (London), vol. 4, page 234, December, 1941. Average values of 1505 feet per second were obtained as the limit velocity of the projectile which the laminate could withstand. By way of comparison, a sheet of aluminum alloy No. 24–ST of the same thickness (0.188 inch) when tested with the same projectile under like conditions has a limit velocity of 1900 feet per second. On a weight basis, the laminate of this invention is 18 per cent more efficient than is the aluminum, as may be seen from the following calculation wherein the figure 2.7 is the density of aluminum and 1.8 is the density of the nonmetallic laminate.

$$\frac{1505}{1.8} \div \frac{1900}{2.7} \times 100 = 118\%$$

This means that only about 85 pounds of the laminate of this invention is needed to afford protection against low velocity projectiles equal to that afforded by 100 pounds of aluminum of equal thickness.

Expressed another way, a 15 per cent savings in the weight of armor in a plane may be made without sacrificing protection, and a correspondingly heavier pay load may be carried.

*Example 2.*—Several sheets of the same fibrous glass textile as was employed in the preceding example were stacked one above another with the warp in each layer at 90° to that in adjacent layers. Between successive layers of the fibrous glass textile were inserted sheets of an ethyl cellulose film .006 inch thick containing 85 per cent of ethyl cellulose having an ethoxy content of 48.5 per cent, 15 per cent of the same phosphate plasticizer as was employed in the preceding example, and 1 per cent of stearic acid. This assembly was placed in a mold, preheated for 8 minutes at 370° F., and subjected to a pressure of 1500 pounds per square inch at that temperature for 2 minutes, after which the laminate was cooled and removed from the mold as before. The finished article in this instance had a thickness of .122 inch and a specific gravity of 1.61. Samples of the so-formed article were tested for their resistance to the impact of projectiles in the manner described above and limit velocities having average values of about 1000 feet per second were obtained.

By way of comparison, the limit velocity of a similar thickness of aluminum sheet, when tested with the same projectile, is about 1400 feet per second. A calculation similar to that set forth in the preceding example indicates that the nonmetallic armor of this invention is 120 per cent as effective on a weight basis as is an aluminum sheet of the same thickness.

*Example 3.*—In a manner similar to that set forth in Example 1, laminates were prepared in various thicknesses from $\frac{1}{16}$ to $\frac{1}{4}$ inch, and were compared with aluminum sheets of the same thicknesses. The data respecting limit velocities, and relative efficiency of the nonmetallic armor, computed as in the preceding examples, are given in the following table.

*Limit velocity, feet per second*

| Thickness, inch | Nonmetallic Laminate d=1.80 | Aluminum Sheet d=2.70 | Relative stopping power, per unit weight (Al=100%) |
|---|---|---|---|
| | | | Per Cent |
| .0625 | 750 | 900 | 124.5 |
| .100 | 980 | 1,250 | 117.5 |
| .128 | 1,150 | 1,500 | 115. |
| .150 | 1,300 | 1,650 | 118.2 |
| .200 | 1,650 | 2,000 | 124. |
| .225 | 1,800 | 2,150 | 125.5 |
| .250 | 2,000 | 2,380 | 125.5 |

The tests reported above, with respect to the resistance of the new laminates to various projectiles, were all made under conditions such that the path of the projectile was normal to the target. This however, is only one of the many conditions to which armor is subjected in actual combat. The more typical situation involves a projectile which will impinge at an oblique angle to the armor surface. While it is difficult to establish precise standards for tests under such conditions, sufficient evidence has been obtained to indicate a marked superiority of the new laminated structures over aluminum plate of equal thickness when struck similarly glancing blows by similar projectiles of equal velocities.

By way of contrast with all of the foregoing data respecting the article of the present invention, tests were made of the stopping power of articles with other cellulose derivative binders, and of ethyl cellulose slabs alone. To illustrate, a laminate such as that here claimed but with a binder of cellulose acetate of the AR–M type, having a thickness of 0.173 inch, and tested as were the articles of this invention, withstood projectiles only up to 1080 feet per second. A slab of ethyl cellulose composition of the type used in this invention, but without the glass textile, had a limit velocity of only 760 feet per second at a thickness of 0.77 inch. A similar slab of another type of ethyl cellulose composition, normally used for making moldings with high impact strength at low temperatures, had a limit velocity of only 460 feet per second.

The armor of the present invention need not be, and seldom is, employed in the form of a flat sheet. After lamination has been effected, it is possible to impart curved shapes to such a structure by compression methods carried out in suitable forming apparatus at temperatures in the range from about 220 to 300° F. In this manner helmets, vests, and various shields may readily be produced.

The invention has been illustrated with respect to the use of fibrous glass textiles having continuous glass warp and a cotton or a glass filler. There may be employed instead a specially prepared textile comprising a continuous glass warp and an ethyl cellulose composition filler in the form either of thread or flat tape. Such a textile can be laminated to other sheets of like material without the necessity for a special coating operation. It has been found that little if any strength is contributed to the laminated articles by the cotton filler in the uni-directional textiles which have been employed. The substitution of an ethyl cellulose thread for the cotton thread results in the removal of a certain weight of material which is useless from the standpoint of the finished armor and permits the production of a more efficient laminated structure.

In another modification of the invention, continuous glass filaments may be drawn and during their production deposited while still warm on a moving sheet of ethyl cellulose in which the filaments may be imbedded by virtue of their temperature or by means of slight pressure. This may provide a sheet fully equivalent to the coated textile described in the examples given above.

It has been observed that the fibrous glass textiles which are commercially available are treated with a sizing agent to facilitate handling and fabrication operations. In some cases that sizing agent is a high molecular weight aliphatic amine. Samples of fibrous glass textiles have been obtained without sizing and, while it has been found possible to produce the armor of the present invention with an unsized fabric, it is believed that better performance is obtained from an armor in which the glass fibers carry a sizing agent of the type which is commercially present on glass textiles.

An advantage of the present invention which has not been mentioned heretofore is the non-splintering characteristic of the present armor when it is punctured by a high velocity projectile. When punctured, few particles separate from the sheet and these are relatively noninjurious. This is in marked contrast with the properties of metallic armor plates which are known to produce sharp fragments when punctured. This is of considerable importance, for example, in an airplane where the presence of fragmentation particles will greatly increase the hazard of injury to the personnel.

Preliminary medical reports indicate that, when the present armor is punctured by a projectile, no systemic reaction results from small particles of the laminate which may be driven into and become imbedded in the flesh. This is in contrast to the well-known complications which arise from particles of steel, brass, or aluminum under like circumstances.

We claim:

1. A nonmetallic armor for protection against low velocity projectiles, comprising an internally yieldable laminated structure of which from 70 to 80 per cent is a plurality of layers of a fibrous glass textile having a continuous filament type of warp and having a cotton filler, and correspondingly from 30 to 20 per cent of a binding agent containing from 80 to 90 per cent of ethyl cellulose having an ethoxy content of from 47 to 49 per cent and a viscosity between 80 and 120 centipoises when measured as a 5 per cent solution in 80:20 toluene-ethanol, from 4 to 6 per cent of a mold release agent comprising stearic acid and magnesium stearate, and the balance, not to exceed 15 per cent, of a solvent plasticizer for the ethyl cellulose.

2. The article as claimed in claim 1 wherein each layer of the fibrous glass textile is turned with its warp at 90° to those of adjacent layers.

3. The article as claimed in claim 1 wherein pairs of layers of the fibrous glass textile are provided with their warps in alignment and each such pair is turned with the warps therein at 90° to those of adjacent pairs.

4. The article as claimed in claim 1 wherein the mold release agent consists of approximately equal parts of stearic acid, magnesium stearate and the methyl ester of 12-hydroxy stearic acid.

5. The article as claimed in claim 1 wherein the binding agent is a mixture of about 82 per cent of ethyl cellulose having an ethoxy content of about 48.5 per cent and a viscosity of about 100 centipoises when measured as a 5 per cent solution in 80:20 toluene-ethanol, about 6 per cent of a mold release agent consisting of approximately equal parts of stearic acid, magnesium stearate and the methyl ester of 12-hydroxy stearic acid and about 12 per cent of mono-phenyl di-orthoxenyl phosphate.

EARLE L. KROPSCOTT.
ARNOLD R. GABEL.

REFERENCES CITED

The following references are of record in the file of this patent:

UNITED STATES PATENTS

| Number | Name | Date |
|---|---|---|
| 1,982,787 | Cherry | Dec. 4, 1934 |
| 2,372,983 | Richardson | Apr. 5, 1945 |
| 2,377,846 | Dreyfus et al. | June 5, 1945 |
| 2,381,542 | Hyatt et al. | Aug. 7, 1945 |

FOREIGN PATENTS

| Number | Country | Date |
|---|---|---|
| 396,405 | Great Britain | Aug. 2, 1933 |

OTHER REFERENCES

Article in "Modern Plastics" of May, 1944, pages 100–103.

"Ethocel Handbook" published in 1940 by the Dow Chemical Co., Midland, Michigan, pages 26 and 32.